Feb. 4, 1941.　　　M. ALDEN　　　2,230,663
ELECTRIC CONTACT AND WIRE ASSEMBLY MECHANISM
Filed Jan. 18, 1940　　　4 Sheets-Sheet 1

INVENTOR
Milton Alden
BY
ATTORNEY

Feb. 4, 1941. M. ALDEN 2,230,663
ELECTRIC CONTACT AND WIRE ASSEMBLY MECHANISM
Filed Jan. 18, 1940 4 Sheets-Sheet 2
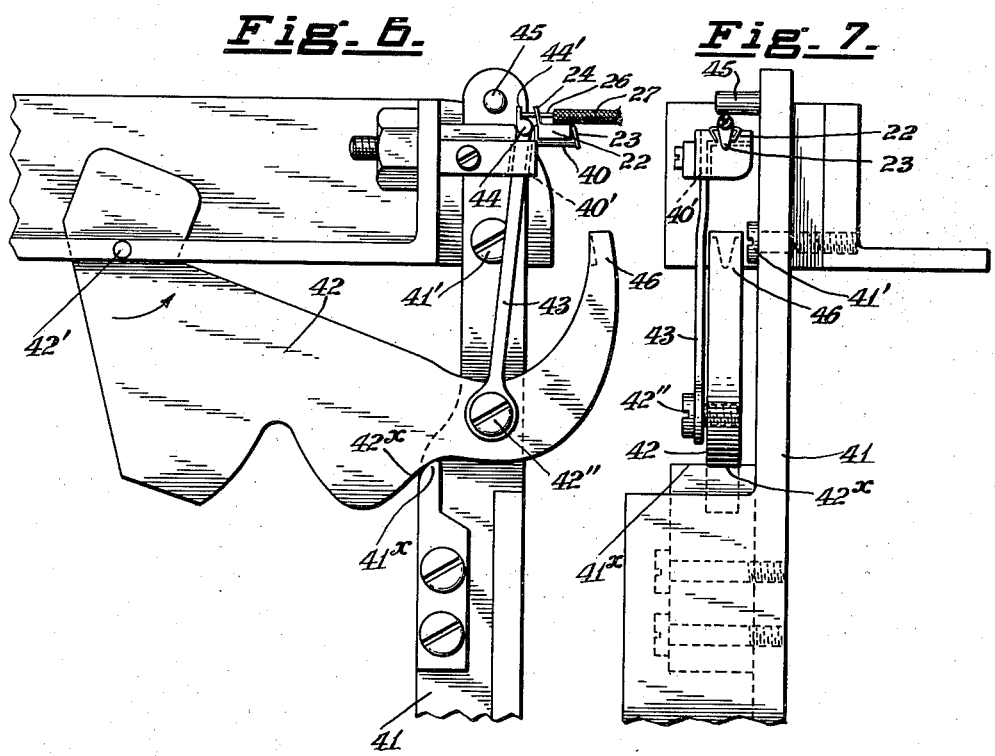
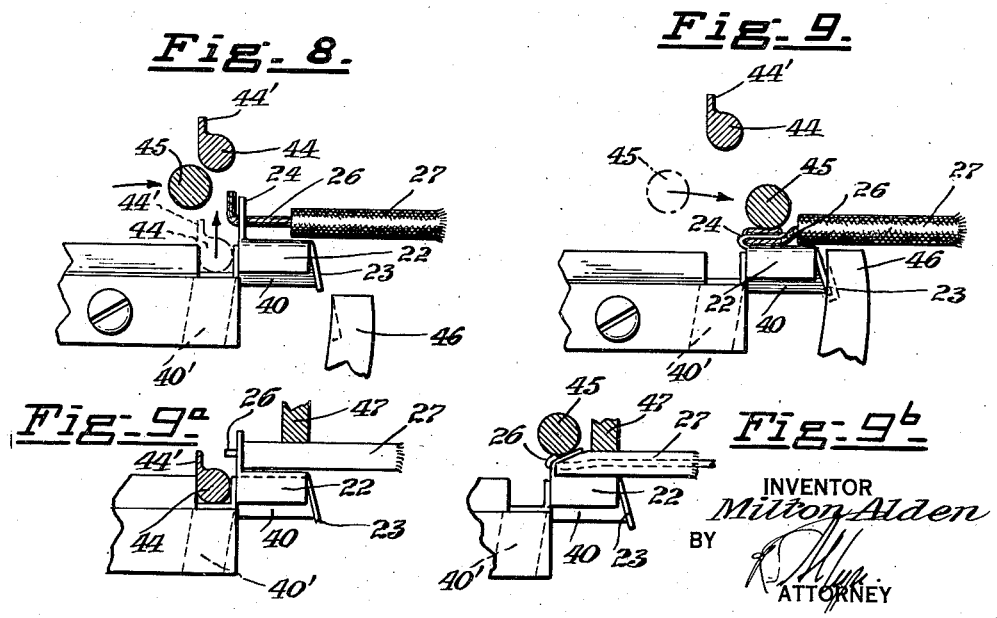
INVENTOR
Milton Alden
BY
ATTORNEY Feb. 4, 1941. M. ALDEN 2,230,663
ELECTRIC CONTACT AND WIRE ASSEMBLY MECHANISM
Filed Jan. 18, 1940 4 Sheets-Sheet 3
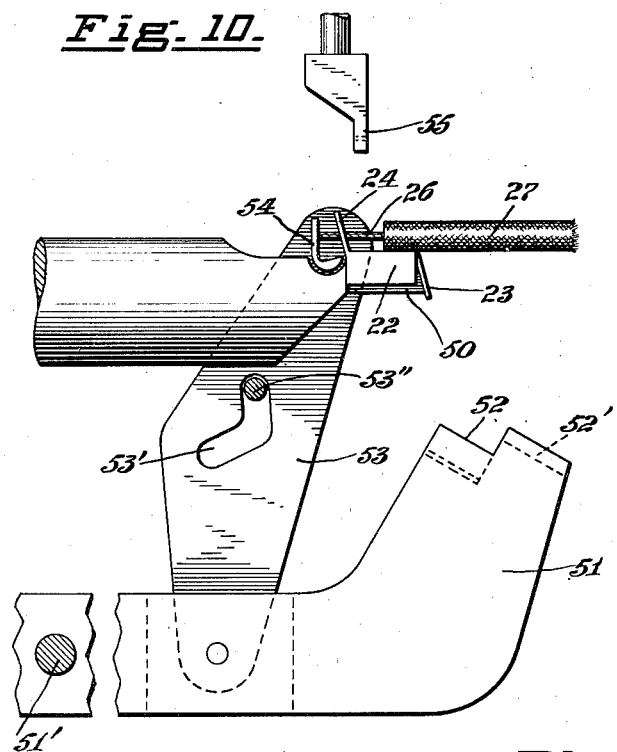
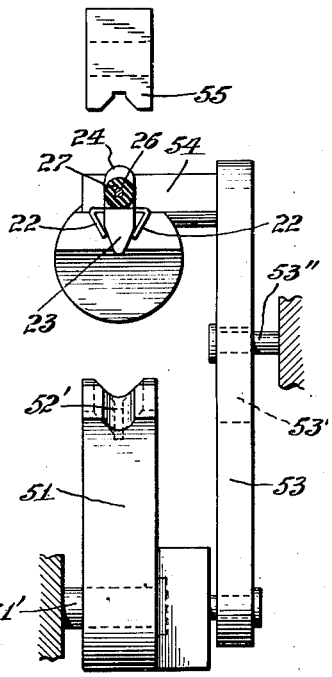
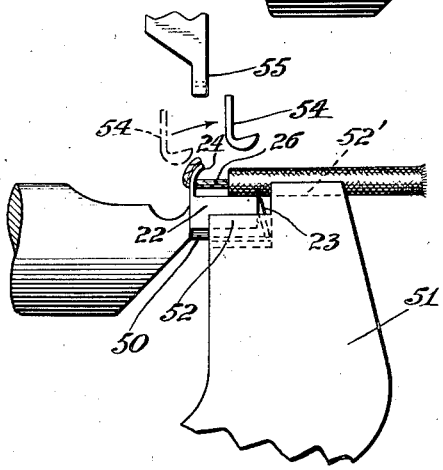
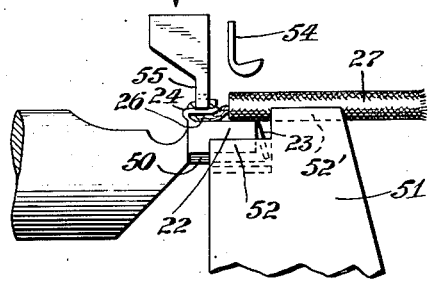
INVENTOR
Milton Alden
BY
ATTORNEY

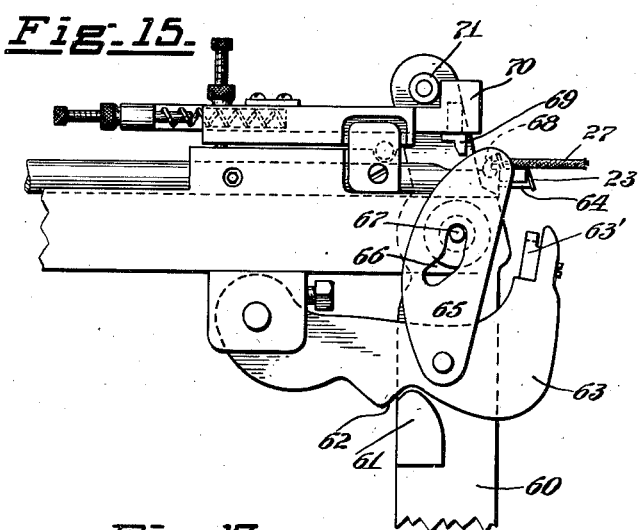
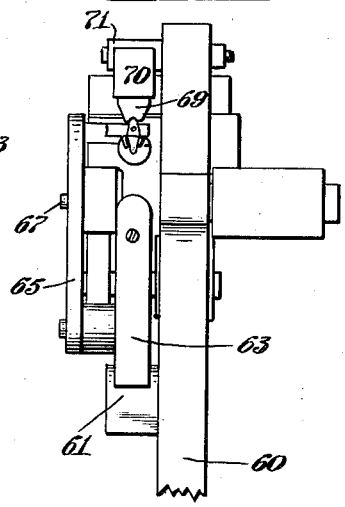
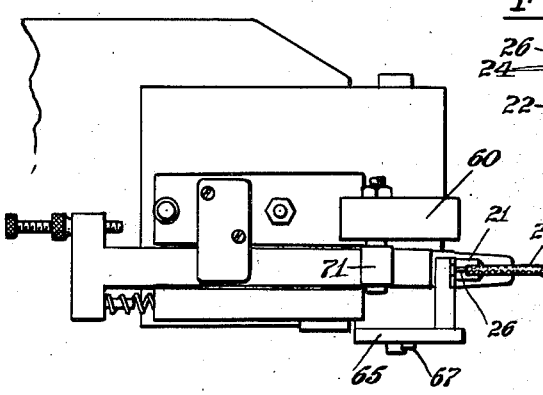
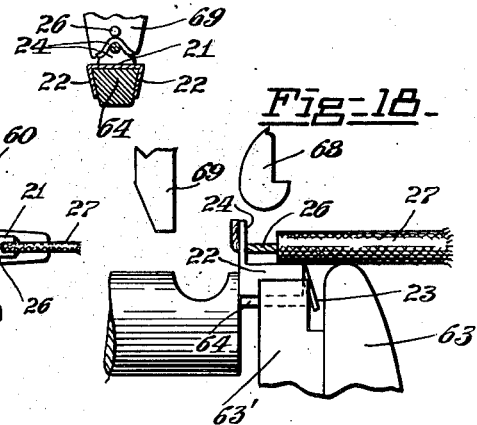
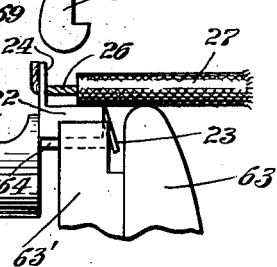
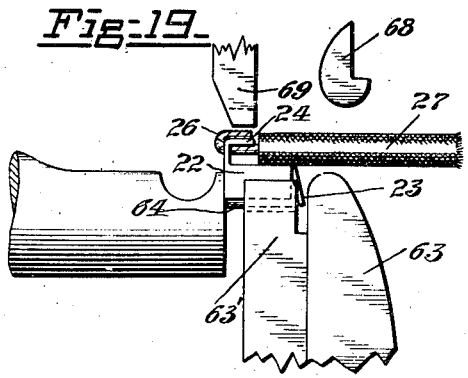
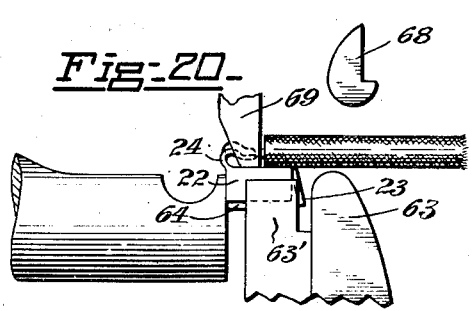

Patented Feb. 4, 1941

2,230,663

UNITED STATES PATENT OFFICE 2,230,663

ELECTRIC CONTACT AND WIRE ASSEMBLY MECHANISM

Milton Alden, Brockton, Mass.

Application January 18, 1940, Serial No. 314,527

12 Claims. (Cl. 153—1)

My invention relates to tools or mechanism for uniting contacts for radio tubes and the like to leads or conductor wires.

These tools may take different forms depending upon the form of clip to be used, the speed of operation required, and the capital investment available. The device may be hand operated, automatic or semi-automatic.

I have shown several different devices and arrangements embodying my invention for securing the clip to the wire preparatory to soldering the wire to the clip.

Figs. 6 and 7 are side and front views of an organized machine for attaching the clips to conductors showing the parts after the clip has been placed in the machine and the conductor inserted but before the tab of the clip has been bent.

Figs. 8 and 9 are detail views on a larger scale showing two steps in the attaching operation of the device of Figs. 6 and 7.

Figs. 9a and 9b are fragmentary details showing another modification of tools for fastening a clip to an insulated conductor.

Figs. 10 and 11 are side and front views of another form of machine for securing a clip to a conductor.

Figs. 12, 13 and 14 are detail views on a larger scale showing three steps in the securing operation of the device of Figs. 10 and 11.

Figs. 15, 16 and 17 are side, front and plan views of another form of mechanism for attaching such clips.

Figs. 18, 19 and 20 are enlarged fragmentary views of the tools of Figs. 15, 16 and 17 showing different stages in the securing action.

Fig. 21 is an end view and partial section of the last position of the forming jaws.

Figure 5:
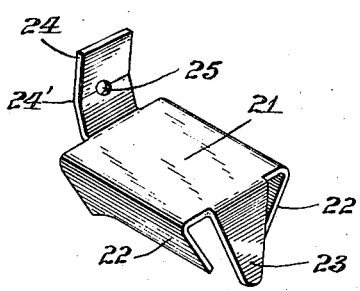
Fig. 5 is a perspective view of one form of clip or contact.

The form shown on Sheet 1 of the drawings is intended to attach a clip such as shown in Fig. 5 to an insulated wire. The clip is formed of sheet metal and partially formed with a main stem contact portion 21, two side wing contacts 22, 22, and a foot 23 to be wedged into a recess in an insulating socket body and a soldering or terminal lug or tab 24 having a hole 25. The conductor wire 26 has an insulating covering 27 which may be stripped back before or during the insertion of the tip of the wire 26 through the hole 25 in the tab.

Figure 1:
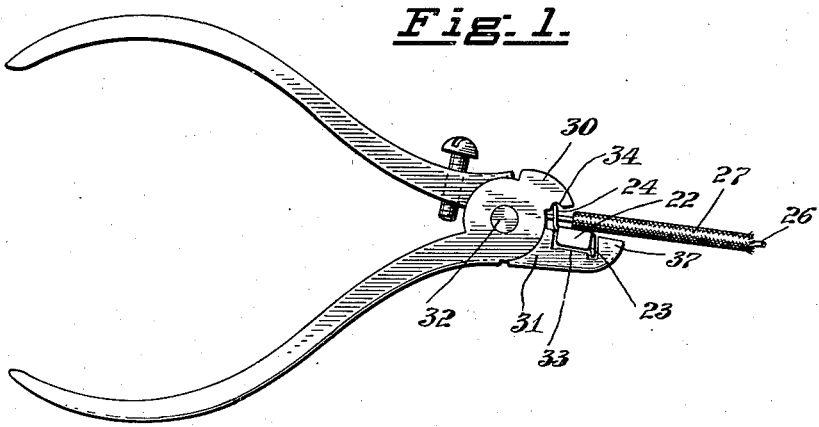
Fig. 1 is a side view of a simple form of device in the form of a pair of pliers for securing a clip to a conductor, the parts being in the positions they occupy at the start of the gripping action.
Figure 2:
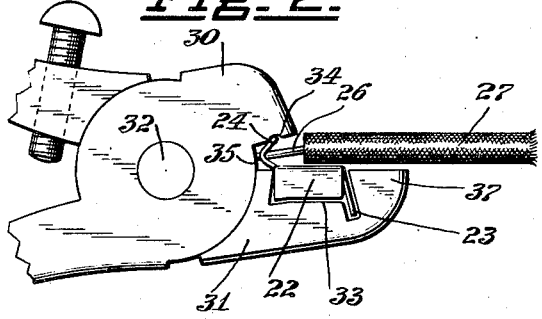
Fig. 2 is a side view of the clasping jaws on a larger scale showing the wiring tab slightly bent after the start of the gripping action.
Figure 3:
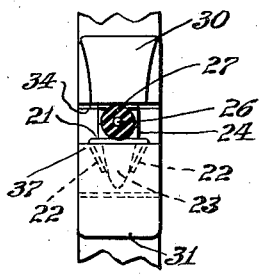
Fig. 3 is an end view of the jaws with a clip and conductor in place in section.
Figure 4:
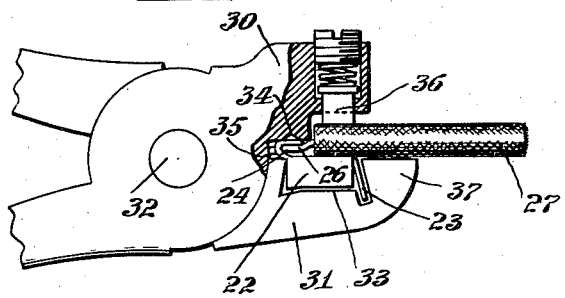
Fig. 4 is a similar view to Fig. 2 showing the parts fully connected. This view also shows a yielding gripper for the insulation which may be used if desired.

In the form shown in Figs. 1 to 4 either part 30 or 31 may be regarded as movable on the hinge 32 with respect to the other or both may be movable. One may be fixed to a support and the other actuated by hand or by power. The part 31 has a recess 33 to receive and support the main part of the clip. The other part 30 has a notch 34 to engage the tip of the lug so as to bend it over and clamp the wire as shown in Fig. 4. The tab 24 may have a slight initial bend or groove 24' to ensure that the tab will bend at the right place. The part 30 has an abutment 35 for the end of the wire so that the proper length will protrude through the hole 25. Instead of stripping the insulation from the end of the wire before insertion into the device, the wire can be stripped by the act of insertion of the wire end through the hole 25 if the insulation is not too hard or too closely adherent to the wire. In that event the end of the tab may be bent over the end of the insulation.

In Fig. 4 I have shown a spring pressed gripper 36 in the upper jaw for engaging and holding insulation near the clip. The lower jaw may also have an extension 37 for supporting the conductor near the clip.

In the form shown on Sheet 2 there is a stationary anvil or support 40 for the clip shaped in cross-section to receive the triangular sectioned clip. The lever 41 is hinged at 41' and adapted to be actuated by a pedal (not shown). The arm 42 is hinged at 42'. The link 43 is hinged at 42'' to the arm 42 and is guided at 40' in a stationary part of the machine. The lever 41 has a shoulder 41x adapted to engage a cam surface 42x so that when the lever 41 is swung to the rear about pivot 41' the shoulder 41x will raise the cam 42x and move the link 43 and its bending tool 44 upwardly and bend the end of the wire as shown in Fig. 8. This movement is followed immediately by the swinging of the tool 45 during which it bends the tab and wire tip over to the position of Fig. 9. The tool 44 has a shoulder 44' serving as an abutment for the tip of the wire as it is inserted through the hole 25 in the tab 24 (see Fig. 5). The arm 42 has a tip 46 which swings up and serves as a holder against the end of the tab in the position of Fig. 9 and as a support for the anvil 40.

The tip of the wire may be stripped as shown in Fig. 9a by the mere act of pressing the end of the wire and the insulation against the tab with the wire in line with the hole in the tab and an additional gripper jaw 47 may be employed to hold the insulation while bending the tab. In this case the bending over of the end of the tab may crush and hold the insulation as shown in Fig. 9b. When the lever 41 is released the arm 42 and attached link 43 drop back into place ready for another operation.

In the form shown on Sheet three the anvil 50 supports the clip. The lever 51 is pivoted at 51' and has a portion 52 for supporting the anvil in the position of Fig. 13 and a groove 52' for supporting the insulation of the conductor. The link 53 is hinged to lever 51 and has an angular slot 53' guided by a stationary pin 53" so that the bending stop 54 carried by the upper end of 53 will travel first upwardly and then over to the positions of Fig. 13 to bend the tip of the wire.

After this the plunger 55 is brought down to compress the tip of the wire and the tab as shown in Fig. 14. This action ensures a more accurate and smooth bending of the tab without making too sharp a bend.

Sheet four shows another form embodying my invention. The treadle lever 60 has a shoulder 61 engaging a cam 62 on the hinged arm 63 which carries an adjustable tip 63' for engaging and supporting the clip and the anvil 64 in the position of Figs. 18, 19 and 20. The link 65 hinged to 63 is guided by a slot 66 and pin 67 and carries the bending stop 68 at its upper end. The stamping punch 69 is carried by a slide 70 which is spring pressed toward the rear and moved toward the front by the projection 71 on the treadle lever. The punch slide also tilts downward at the front to engage the wire end and the tab and press them into their final shape. Preferably the punch is concave so as to form a boss on the end of the tab of the clip. The various parts of the punch and die devices of this form are adjustable to permit them to be brought into position to properly handle clips of different sizes and shapes and produce the necessary bends without injury to the metal.

It is especially to be noted that I have shown member 63' as movable upon member 63 or detachable therefrom so as to allow the substitution of members of other sizes or shapes. By selecting a suitable size and shape of this member, I can modify the shape of the end of the clip, as assembled on the wire.

It will be understood that the wire is usually soldered to the tab of the clip after they have been assembled as above set forth.

In order to facilitate fastening the wire thereto, the tab of the clip may be preformed with a longitudinally extending groove embossed therein, so that it will then appear as shown in Fig. 21.

While I have shown the end of the clip as being shaped rectangularly, it is to be understood that this end may be of any desired configuration and the elements of the assembly devices may then be shaped accordingly, so as to accommodate such different shape. Likewise the tab may be bent as shown in Fig. 5, or may be flat as shown in Fig. 8.

I claim:

1. A wire and contact assembling device comprising a support for a contact having a perforated tab, means for supporting an insulated wire with an uninsulated tip extending through the perforation in the tab, and means for sequentially bending the tab and clamping the bent tab onto the tip of the wire.

2. A wire and contact assembling device comprising a support for a contact having a perforated tab at one end, means for supporting the opposite ends of the contact, means for limiting the insertion of the wire through the perforated tab and means for bending over the tip of the tab while the contact is held between the abutments.

3. A machine of the character described comprising means for supporting a contact having a perforated tab extending laterally from one end so that the end of an insulated wire may be placed on one face of the contact and the bare tip of the wire inserted through the perforation in the tab and means for bending over the end of the tab and clamping it upon the wire.

4. The combination of an anvil for suporting a contact having a perforated tab projecting laterally from one end, means for bending the tip of a wire inserted through the tab, and means for bending the end of the tab and clamping it to the end of the wire.

5. The combination of an anvil for supporting a contact having a perforated tab projecting laterally from one end, means for bending the tip of a wire inserted through the tab, means for bending the end of the tab and clamping it to the end of the wire, and means for supporting the end of the anvil and the contact mounted thereon.

6. An anvil for supporting a contact, means for supporting the insulated portion of a wire while the bare tip of the wire is interlocked with the contact, means for giving a preliminary bend to the wire and to a part of the contact and means for applying a bending force to a part of the contact to secure it to the wire.

7. Means for supporting a contact with a perforated tab projecting laterally from one end so that the bare tip of an insulated wire can be inserted through the perforation in the tab and means for bending a part of the tab to clamp it upon the wire.

8. In a device for fastening a wire tip to a contact having a perforated tab projecting laterally from one end thereof, an anvil for supporting the contact, means for holding the contact on the anvil, means for bending said wire tip inserted through said tab and means for bending the end of said tab and clamping it to the end of said wire.

9. In a machine for uniting an electrical contact having a perforated tab at one end to an insulated wire, means for holding said tab stationary and means for advancing the core of said wire through the perforation in said tab, whereby the end of said wire is exposed free from insulation for a predetermined distance, means for bending over the portion of said wire which has passed through said perforation, and means for bending over and clamping said tab upon said wire.

10. A machine for uniting an electrical contact having a perforated tab at one end to an insulated wire, including means for engaging the insulation of said wire so as to restrain movement thereof, means for inserting the tip of said wire through the perforation of said tab, means for bending the portion of said wire extending through said perforation, and means for bending over said tab upon a part of said wire near the end thereof.

11. A device according to claim 10 and also including means for causing the bent-over portion of said tab to at least partially embrace the sides of said wire.

12. In a machine for securing a wire having an insulating cover to a contact for an electrical device, said contact having a perforated tab projecting from a side thereof, an anvil for supporting the contact and permitting the perforated tab to project from the contact so that the bare tip of the wire may be inserted through the tab, means for pressing the bare tip of the wire against a part of the contact and means for bending the tab and clamping the end of the insulation of the wire between the contact and the tab.

MILTON ALDEN.